United States Patent [19]

Lawrence et al.

[11] Patent Number: 5,545,312

[45] Date of Patent: Aug. 13, 1996

[54] REPLACEMENT OF PARTICLES IN A MOVING BED PROCESS

[75] Inventors: Roger R. Lawrence, Elmhurst; Frank T. Micklich, Joliet; Charles T. Ressl, Mount Prospect; Paul A. Sechrist, Des Plaines, all of Ill.

[73] Assignee: UOP, Des Plaines, Ill.

[21] Appl. No.: 239,002

[22] Filed: May 6, 1994

[51] Int. Cl.$^6$ .................................................. C10G 35/10
[52] U.S. Cl. ......................... 208/152; 208/148; 208/155; 208/156; 208/164; 208/165; 208/171; 208/173; 208/174; 208/175; 208/176
[58] Field of Search ..................................... 208/148, 152, 208/155, 156, 164, 165, 171, 173, 174, 175, 176

[56] References Cited

U.S. PATENT DOCUMENTS 4,398,852  8/1983  Milligan ................................ 208/152
4,576,712  3/1986  Greenwood ........................... 208/173

*Primary Examiner*—E. Rollins Cross
*Assistant Examiner*—Walter D. Griffin
*Attorney, Agent, or Firm*—Thomas K. McBride; John G. Tolomei; Michael A. Moore

[57] ABSTRACT

A method and apparatus for replacing particles in a process that transfers particles is disclosed. This invention employs a seal zone which is in communication with two zones of the process and in which particles that are being added to the process are purged. This invention allows particles to be replaced without reducing the normal rate of particle transfer through the process, which results in a savings in downtime costs. This invention is adaptable to a multitude of processes for the catalytic conversion of hydrocarbons in which deactivated catalyst particles are regenerated.

18 Claims, 1 Drawing Sheet

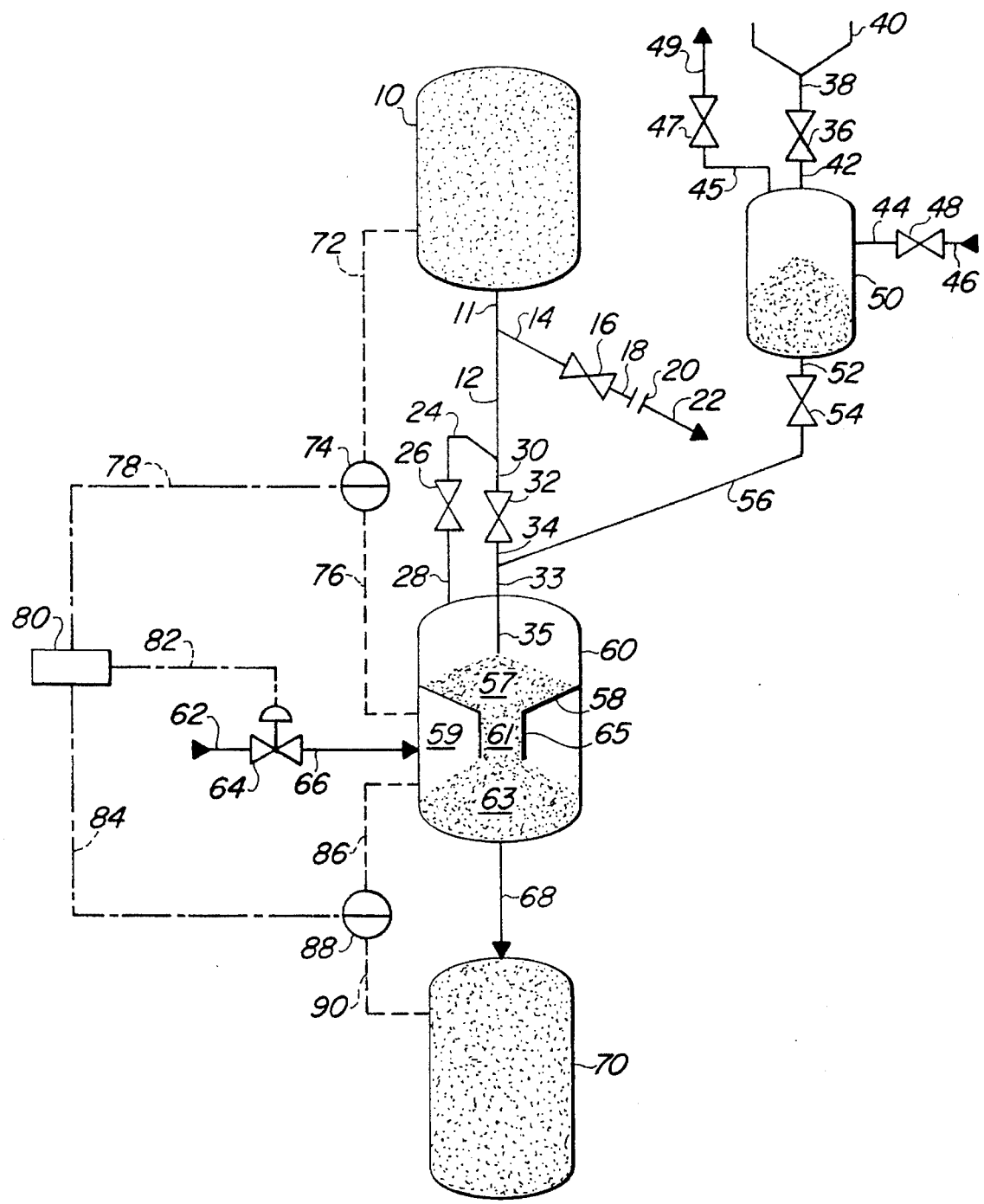

REPLACEMENT OF PARTICLES IN A MOVING BED PROCESS

FIELD OF THE INVENTION

The broad field of the present invention is the handling and transport of particles. The narrow field of the present invention is the replacement of particles in processes that employ moving beds. The present invention is directed toward an improved method for replacing particles in moving bed processes having zones which contain fluids that are inhibited from communication.

BACKGROUND OF THE INVENTION

Catalytic processes for the conversion of hydrocarbons are well known and extensively used. Invariably the catalysts used in these processes become deactivated for one or more reasons. Some of these reasons include the accumulation of coke deposits, the accumulation of nonmetallic poisons such as sulfur and nitrogen, the accumulation of metallic poisons such as iron and lead, the agglomeration of catalytically-active metals such as platinum and palladium, and the degradation of the catalyst support such as pore enlargement and phase transformation. Depending on the nature of the catalyst and the kind and degree of deactivation, the catalyst may become deactivated permanently. Catalyst that is neither usable nor regenerable in situ must be removed from the process and replaced with fresh or regenerated catalyst.

One method of replacing catalyst in a process is to stop the normal operation of the process, unload the spent catalyst, load fresh catalyst, and then resume normal operation of the process. Although straightforward, this method requires a period of time when the process is not normally operating. This period of time, called downtime, is lost production time that can be a significant expense in commercial hydrocarbon conversion operations.

A method that replaces the catalyst in a hydrocarbon conversion process should have several objectives. First, it should eliminate downtime, thereby making the process more profitable. Second, it should purge the fresh catalyst prior to loading to remove contaminants that would affect adversely the performance of the process. Third, it should not require a reduction in the normal or design rate of catalyst movement through the process. And, fourth, it should allow the process control systems that ensure reliability during normal operation to continue in operation during the catalyst replacement.

The present invention achieves these objectives in hydrocarbon conversion processes that employ a moving bed of catalyst that is transferred between two or more zones. The present invention is particularly useful for those processes that employ zones containing fluids that are inhibited from communication, such as a process employing a reaction zone containing hydrocarbons and a regeneration zone containing oxygen. If the two zones are connected by a pipeline, communication between the two zones can be inhibited by dosing valves in the pipeline, but this also stops the flow of catalyst between the zones. Besides, valves that dose in pipelines containing flowing catalyst are generally maintenance problems, because of leakage due to wear from catalyst particles and malfunction due to high temperatures.

But neither dosing valves nor stopping catalyst flow are requirements for inhibiting communication between two zones. Introducing an inert fluid into a purge, or buffer, zone between the zones can accomplish this goal, even while catalyst is flowing between the zones. The inert fluid is generally added into a purge zone at a pressure higher than the pressure of either zone. Beginning at the point of introduction of the inert fluid, two portions of the inert fluid flow in opposite directions—one portion toward one zone and the other toward the other zone. Therefore, relative to the flow of catalyst, one portion of the inert fluid flows countercurrently whereas the other portion flows cocurrently. The two portions of the inert fluid effectively purge the catalyst between the two zones and inhibit the communication of the two fluids.

In moving bed processes that employ a purge zone like that just described, the present invention uses the existing purge zone vessel and its associated process control instrumentation to replace the catalyst. Therefore, in addition to achieving the objectives described above, the present invention maximizes the use of existing equipment and minimizes the need for additional equipment that would sit idle except during catalyst replacement. For these reasons, this invention is a simple, efficient, and cost-effective method of replacing catalyst in moving bed processes.

BRIEF SUMMARY OF THE INVENTION

The present invention provides a method and apparatus for replacing particles in a process that transfers solid particles.

In a broad embodiment, the method comprises withdrawing a first stream comprising particles from a first zone. This first stream is rejected from the process. A second stream comprising particles and a first fluid is introduced to a second zone, and the particles are passed through the second zone. A third stream comprising a second fluid is passed to the second zone at a rate that is sufficient to purge the first fluid from the total void volume in said second zone. A fourth stream comprising the first fluid and the second fluid is withdrawn from the second zone and passed to the first zone. A fifth stream comprising particles and the second fluid is withdrawn from the second zone. The fifth stream is passed to a third zone that is in uninterrupted communication with the second zone.

In a more detailed embodiment, the method comprises a process in which catalyst particles are passed from a first zone to a second zone and from the second zone to a third zone. The passage of catalyst particles from the first zone to the second zone is interrupted. A first stream comprising catalyst particles is withdrawn from the first zone. This first stream is rejected from the process. A second stream comprising catalyst particles and oxygen is introduced to the second zone, and the catalyst particles are passed through said second zone. A third stream comprising nitrogen is passed to the second zone at a rate that is sufficient to purge oxygen from the total void volume in the second zone. A fourth stream comprising oxygen and nitrogen is withdrawn from the second zone and passed to the first zone. A fifth stream comprising catalyst particles and nitrogen is withdrawn from the second zone. The fifth stream is passed to a third zone that is in uninterrupted communication with the second zone.

The apparatus allows for the replacement of particles in a process for the transfer of particles. The apparatus comprises three vessels. A vertically-positioned first vessel has a first particle outlet. A vertically-positioned second vessel is located below the first vessel. The second vessel has a first particle inlet and a second particle outlet, and particles may move by gravity from the first particle inlet to the second particle outlet. The second vessel defines a lower portion for containing particles. The second vessel also defines a means for gas addition, means to distribute gas about the lower portion of the second vessel for contact with particles in the second vessel, and a gas outlet. A vertically-positioned third vessel is located below the second vessel and has a second particle inlet. A vertically-extended first conduit for containing a gas flow restriction comprising a bed of particles is in communication with the first particle outlet to remove particles therefrom. A vertically-extended second conduit is in communication with the first conduit to remove particles therefrom and also with the first particle inlet to supply particles thereto. A means allows for communicating gas from the gas outlet to the first vessel and for restricting the flow of gas from the gas outlet. A vertically-extended third conduit is in communication with the second particle outlet to remove particles therefrom and also with the second particle inlet to supply particles thereto. A means allows for discharging particles from the first vessel. A third particle inlet is in communication with the second vessel.

Other objects, embodiments, and details of the present invention are presented in the following detailed description of the present invention.

BRIEF DESCRIPTION OF THE DRAWING

The drawing is a schematic flow diagram of a preferred embodiment of the method of this invention of replacing solid particles in a process that transfers solid particles. The drawing is a schematic flow diagram of the method of replacing solid particles in which only those lines, valves, etc., relevant to the flow of catalyst particles are shown.

DETAILED DESCRIPTION OF THE INVENTION

In its broadest terms, the present invention can be used to replace solid particles in a multitude of processes that transfer particles between any two zones which contain fluids that are inhibited from communication. One such application that requires inhibited communication between the fluids of two zones is the transfer of catalyst between an oxygen-containing regeneration zone and a hydrocarbon-containing reaction zone. Other applications include transferring noble-metal catalyst between an oxygen-containing regeneration zone and a hydrogen-containing zone which reduces the noble metals, and transferring catalyst between an oxygen-containing regeneration zone and a hydrogen-containing zone which transports the catalyst to the hydrocarbon-containing reaction zone. In these applications, inhibiting communication is necessary because the fluids of the two zones could react with each other to form water. The presence of water in either the reaction zone or the regeneration zone affects the performance of many hydrocarbon conversion catalysts.

Systems having a hydrocarbon-containing reaction zone and an oxygen-containing regeneration zone, as applied to petroleum refining, may be employed in a wide variety of hydrocarbon conversion reactions including catalytic reforming, fixed-bed alkylation, hydrorefining, hydrocracking, dehydrogenation, hydrogenation, steam reforming, etc. The catalysts used in these processes are maintained in one or more hydrocarbon-containing zones. Over time, the catalyst in the reaction zone(s) generally becomes deactivated because of the accumulation of coke deposits. Regeneration of the catalyst to remove the coke deposits helps restore the activity of the catalyst. Coke deposits are generally removed from me catalyst by connecting the catalyst with an oxygen-containing gas to combust and remove the coke in a regeneration zone. Many of these processes use a reaction zone and a regeneration zone in side-by-side relation to each other. In these systems, the catalyst is continuously or semi-continuously removed from the reaction zone and transferred to the regeneration zone for coke removal. Following coke removal, the catalyst is removed from the regeneration zone and transferred back to the reaction zone. Therefore, in these well-known and widely-practiced systems, there is a requirement to transfer the catalyst back and forth between a hydrocarbon-containing zone and an oxygen-containing zone without communication or cross-mixing of the atmospheres of the two zones.

Although a regeneration zone that removes coke by combustion using oxygen has a generally beneficial effect on the catalyst, the combination of extreme combustion temperatures and the water formed during combustion can cause some degree of permanent damage to the catalyst, such as a reduction in the catalyst's surface area. The degree of permanent damage that results from a single regeneration may be insignificant to the catalyst performance, activity, and physical properties. But, the cumulative effect on physical properties of tens or hundreds of successive regenerations can gradually lead to a deterioration in catalyst performance and permanent deactivation. When the losses that result from a deterioration in performance outweigh the cost of replacing the catalyst inventory, economics generally dictate that the catalyst be replaced. The present invention allows this replacement to be done without having to stop the normal operation of the reaction section. Thus, when using this invention, the cost of replacing catalyst is significantly reduced because loss of production due to downtime of the reaction section does not compound the cost of catalyst replacement.

The present invention is applicable to a wide variety of hydrocarbon conversion processes including hydrogenation and dehydrogenation processes, but the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. and an end boiling point of about 400° F. The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iddium, rhodium, palladium) and a halogen combined with a porous carder, such as a refractory inorganic oxide. The halogen is normally chlorine. Alumina is a commonly used carder. The preferred alumina materials are known as the gamma, eta and theta alumina with gamma and eta alumina giving the best results, An important property related to the performance of the catalyst is the surface area of the carrier. Preferably, the carder will have a surface area of from 100 to about 500 m$^2$/g. The particles are usually spheroidal and have a diameter of from about ¹⁄₁₆th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is ¹⁄₁₆th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone. Fresh catalyst particles are fed to a reaction zone, which may be comprised of several sub-zones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-haft minute, that is, catalyst will flow for one-haft minute. If the inventory in the reaction zone is large, the catalyst bed may be considered to be continuously moving. A moving bed system has the advantage of maintaining production while the catalyst is removed and replaced.

The majority of the description of the present invention is presented in terms of transferring catalyst particles from a regeneration zone containing oxygen, to a purge zone containing nitrogen, and to a reaction zone containing hydrocarbon. However, this description is not intended to limit the scope of the invention to this particular arrangement.

The drawing shows a method for the replacement of catalyst particles in a process that transfers catalyst particles between a regeneration zone 10, a seal zone 60, and a reaction zone 70. In the process, catalyst particles are transferred from the regeneration zone 10 to the seal zone 60, and then to the reaction zone 70. The method of replacement of catalyst particles comprises withdrawing spent catalyst particles from the regeneration zone 10 and adding fresh catalyst particles into the seal zone 60. The regeneration zone 10, seal zone 60, and the reaction zone 70 are shown in a relation where the regeneration zone 10 is above the seal zone 60, which is above the reaction zone 70. The regeneration zone 10 and the reaction zone 70 may be maintained independently with their own atmospheres and at their own pressures by any suitable means, and such means are not essential elements of the method.

The withdrawal of spent catalyst particles from the regeneration zone 10 may be by any suitable method. Gases that are entrained with the withdrawn catalyst may be purged from the catalyst prior to withdrawal, but this purging is not an essential step of this invention. Preferably, purging of entrained gases from the withdrawn catalyst particles is not required. The withdrawal may be continuous or semi-continuous. The drawing shows a preferred method of withdrawing spent catalyst particles from a regeneration zone that operates at or above atmospheric pressure and contains oxygen gas. Spent catalyst particles are withdrawn from the regeneration zone 10 through line 11, line 14, valve 16, line 18, a restriction 20, and line 22. The flow of catalyst particles may be by gravity and it may be assisted by a difference in pressure between the regeneration zone 10 and the ambient atmosphere. Exiting from the regeneration zone 10 with the catalyst particles are regeneration gases such as oxygen that escape through the open lines when the valve 16 is opened. Preferably, the combined stream of exiting catalyst particles and regeneration gases is a moving packed bed of catalyst particles between the regeneration zone 10 and the restriction 20. The catalyst particles exiting the line 22 may be transported away to off-site processing by any suitable means, such as in drums or bags, and such means is not an essential element of the method.

The restriction 20 limits the rate of withdrawal of the catalyst particles to either a convenient rate for transporting away the withdrawn catalyst particles or to the design flow rate of catalyst particles through the regeneration zone 10, whichever is smaller. In addition, the restriction 20 may also limit the rate of escape of the regeneration gases to a rate that does not adversely affect the normal operation of the regeneration zone 10. If the regeneration zone operates at a pressure greater than the ambient pressure, the means for reducing the pressure surrounding the withdrawn catalyst particles from the pressure of the regeneration zone 10 to ambient pressure may be the restriction 20, with most of this reduction in pressure may be taken across the restriction 20. Preferably, however, the restriction 20 is the means for maintaining a moving packed bed of catalyst particles in the withdrawal lines 11, 14, and 18 and in the valve 16, and the reduction in pressure occurs substantially uniformly across the withdrawal lines 11, 14, and 18, the valve 16, and the restriction 20. Those skilled in the art of particle transport are capable of designing the size of the opening of the restriction 20, and the sizes and lengths of the lines 11, 14, and 18 and the valve 16 to achieve the desired flow rates of catalyst particles and regeneration gases.

Means for indirect or direct heat exchange may be used to cool the withdrawn catalyst particles, if the temperature of the withdrawn catalyst particles are too hot for handling. An example of indirect heat exchange is a shell-and-tube heat exchanger through which the catalyst particles flow on the tube side and a cooling fluid flows on the shell side. If the temperature of the withdrawn catalyst particles is greater than the ambient temperature, the simplest shell-and-tube heat exchanger would be a conduit, such as line 14, 18, or 22, containing the hot catalyst particles and ambient air surrounding the outside of the conduit. Heat transfer from the conduit to the ambient air may be by natural convection or forced convection. Those skilled in the art of heat transfer are capable of designing a conduit that would be suitable for sufficiently cooling the catalyst particles. An example of direct heat exchange is introducing ambient air into one of the lines through which the catalyst particles are withdrawn, preferably line 14. The catalyst particles are cooled by direct heat transfer to the air, and the air may be disengaged from the withdrawn catalyst particles at the outlet of line 22.

The addition of fresh catalyst particles into the seal zone 60 may be by any suitable method. Gases that are entrained with the fresh catalyst may be purged from the catalyst prior to entering the seal zone 60, but this purging is not an essential step of this invention. Preferably, purging of entrained gases from the fresh catalyst particles is not required before fresh the fresh catalyst particles enter the seal zone 60. The addition of fresh catalyst particles may be continuous or semi-continuous. The drawing shows a preferred, batch-wise method of adding fresh catalyst particles into a seal zone 60 that operates slightly or substantially above atmospheric pressure. Fresh catalyst particles are added into the seal zone 60 via an addition funnel 40 and an addition hopper 50. The drawing shows the addition funnel 40, the addition hopper 50, and the seal zone 60 in a preferred relation where the addition funnel 40 is above the addition hopper 50, which is above and axially offset from the seal zone 60. The catalyst particles that are loaded into the addition funnel 40 may be transported to the funnel by any suitable means, such as in drums or bags, and such means is not an essential element of the method. The flow of catalyst particles from the addition funnel 40 into the addition hopper 50 may be by gravity. The flow of catalyst particles from the addition hopper 50 into the seal zone 60 may be by gravity or it may be assisted by a difference in pressure between the addition hopper 50 and the seal zone 60.

Referring to the drawing, the preferred method of addition of fresh catalyst particles into the seal zone 60 is a 4-step cycle of depressuring, loading, pressuring, and unloading the addition hopper 50. Initially, the addition funnel 40 and the addition hopper 50 are empty and the four valves 47, 36, 48, and 54 that control flow to and from the addition hopper 50 are closed. First, valve 47 is opened and the addition hopper 50 is depressured to atmosphere through line 45, valve 47, and line 49. Second, valve 47 is closed, valve 36 is opened, fresh catalyst particles are placed in the addition funnel 40, and the particles fill the addition hopper 50 through line 38, valve 36, and line 42. Third, valve 36 is closed, valve 48 is opened, and the addition hopper 50 is pressured with nitrogen through line 48, valve 48, and line 44. Preferably, the source of the nitrogen is the plant supply of compressed nitrogen, and the addition hopper 50 is pressured to a pressure that is about equal to the pressure of a surge bed 57 in an upper chamber of the seal zone 60. Fourth, valve 48 is closed, valve 54 is opened, and the addition hopper 50 is unloaded into the seal zone 60 through line 52, valve 54, line 56, and line 33. Finally, valve 54 is closed, and the addition cycle may be started over again. The cycle may be automated into a logical sequence that can be controlled at least in part by an automatic, programmable controller. Those skilled in the art of particle transfer are capable of adding the necessary level instruments, valve actuators, valve position indicators, and timers to automate the sequence.

The seal zone 60 contains three catalyst particles beds—the previously-mentioned surge bed 57, a purge bed 61, and an outlet bed 63. The drawing shows the three beds in a preferred relation where the surge bed 57 is above the purge bed 61, which is above the outlet bed 63. Preferably, the three beds are cylindrical, packed, moving beds. Fresh catalyst particles from the addition hopper 50 enter the surge bed 57. Catalyst particles descend by gravity flow from the surge bed 57, through the purge bed 61, through the outlet bed 6,3, and out of the seal zone 60.

The surge bed 57 is a reserve or surge volume of catalyst particles for supplying the purge bed 61. During catalyst transfer from the regenerator 10 to the seal zone 60, the inventory of catalyst particles in the surge bed 57 is essentially constant, even though catalyst particles flow through the surge bed 57. The inventory of catalyst particles during catalyst transfer is the amount of catalyst in the moving packed bed of catalyst that extends from the bottom of the line 35 to the top of the purge bed 61. But, during catalyst replacement, when catalyst particles are being transferred from the addition hopper 50 to the seal zone 60 according to the addition cycle described previously, the inventory of catalyst in the surge bed 57 may vary. Preferably, when valve 54 opens, catalyst particles drain completely from the addition hopper 50, the line 52, and the valve 54. More preferably, the catalyst particles drain completely from line 56, line 33, and line 35, too. This ensures that there will be no catalyst particles in valve 54 that could damage valve 54 when valve 54 closes. In order for line 35 to completely drain into the surge bed 57,the level of surge bed 57 must be sufficiently low to receive at least the quantity of catalyst in addition hopper 50 before valve 54 opens. Therefore, it is preferred that during catalyst replacement the inventory of catalyst particles in the surge bed 57 increases when catalyst particles are unloaded into the seal zone 60 and decreases during the other steps of the addition cycle. This surge volume may also be sized large enough to accommodate unexpected interruptions or variations in the addition cycle or in the rate of withdrawal of catalyst particles from the surge bed 57. A level instrument may be provided to monitor the variations in the inventory of the surge bed 57 during catalyst replacement.

Of course, the addition process shown in the drawing is intermittent because it is a batch-wise process, but the addition is not limited to intermittent processes. Likewise, the withdrawal process shown in the drawing may be continuous if the valve 16 is kept open, however the withdrawal may also be intermittent if the valve 16 is closed from time to time. Thus, at a given moment during catalyst replacement, the addition rate and the withdrawal rate may be unequal. Preferably, however, the rate of addition of catalyst particles into the seal zone 60 is not less than the rate of withdrawal of catalyst particles from the seal zone 60, in order to maintain the inventory of catalyst particles in the surge bed 57 either substantially constant or within a predetermined preferred inventory range. Furthermore, it is also preferable that the rate of addition of catalyst particles into the seal zone 60 is not less than the rate of withdrawal of catalyst particles from the regeneration zone 10, in order to maintain the combined inventory of catalyst particles in the regeneration zone 10, the seal zone 60, and the reaction zone 70 either substantially constant or within a predetermined preferred inventory range. The terms "rate of addition" or "rate of withdrawal" may refer to an instantaneous rate or to an average rate over a predetermined or convenient time period.

Entering the surge bed 57 with the fresh catalyst particles from the addition hopper 50 may be ambient gases such as oxygen to which the fresh particles were exposed during transport to or addition into the addition funnel 40. A purge stream comprising nitrogen enters the seal zone 60 in order to permit the catalyst particles that have descended into the purge bed 61 from the surge bed 57 to be purged of oxygen to the desired degree. The nitrogen enters the seal zone 60 through line 62, regulating valve 64, and line 66. Control of the amount of nitrogen that enters is by means of the regulating valve 64 operated on differential pressure control by signal selector 80. The source of the nitrogen is preferably the plant supply of compressed nitrogen.

The nitrogen entering the seal zone 60 through line 66 is preferably distributed uniformly upwardly in a counterflow manner through the purge bed 61 from an annular chamber 59. Annular chamber 59 is defined by the wall of the seal zone 60 and a baffle having a vertically-extended cylindrical section 65 that is concentrically located with respect to the seal zone 60. The upper portion of the baffle consists of a frusto-conical section 58 that is attached to the seal zone and supports the upper end of cylindrical section 65. The bottom of the cylindrical section 65 is open and allows gas to be distributed about the entire circumference of the annular chamber 59 and the purge bed 61. The nitrogen passes into the annular chamber 59 which distributes it downwardly and then uniformly upwardly into the purge bed 61 in counterflow relation to the downward movement of the catalyst particles. The distributor may be of any suitable design, such as perforated pipes or conduits or slot-type channels, provided that the distributor inhibits fluidization, attrition, or breakage of catalyst particles that pass nearby. A bed of catalyst particles may act as a distributor, and where a cylindrical bed is used for this purpose in the purge bed 61, the bed has a length: diameter ratio that is at least one. After purging, the catalyst particles descend from the purge bed 61 into the outlet bed 63. The outlet bed 63 is a volume of catalyst particles for supplying the reaction zone 70. The catalyst particles exit the seal zone 60 through a line 68 and into the reaction zone 70.

The nitrogen that enters the seal zone 60 exits in two portions. From the preceding description, one portion flows from the annular chamber 59 upwardly through the purge bed 61. This first portion flows through the surge bed 57 and exits the seal zone 60 through line 28. It passes into the regeneration zone 10 through valve 26, and lines 24, 12, and 11. The other portion flows from the annular chamber 59 downwardly through the outlet bed 63 and exits the seal zone 60 through line 68. This second portion passes into the reaction zone 70.

One consequence of the flow of nitrogen from the seal zone 60 to the regeneration zone 10 is that the annular chamber 59 operates at a pressure that is not less than the pressure of the regeneration zone 10. The pressure of the annular chamber 59 is preferably not less than 2 inches H$_2$O greater than the pressure of the regeneration zone 10. More preferably, the pressure of the annular chamber 59 is not less than 10 inches H$_2$O greater than the pressure of the regeneration zone 10. The pressure difference between the regeneration zone 10 and the annular chamber 59 is measured by a differential pressure measuring instrument 74 that is in communication with the regeneration zone 10 through a pressure tap 72 and with the annular chamber 59 through a pressure tap 76. A set-point that corresponds to the desired differential pressure is present in the instrument 74. The instrument 74 provides an output signal 78 that corresponds to the difference between the actual differential pressure and the desired differential pressure across the beds 61 and 57, valve 26, and lines 28, 24, 12, and 11.

From the preceding description, a stream of catalyst particles and nitrogen passes from the outlet bed 63 of the seal zone 60, through line 68, and into the reaction zone 70. As a result of the flow of this stream, the pressure of the reaction zone 70 is less than the pressure of the annular chamber 59. The pressure of the reaction zone 70 is preferably not less than 10 inches H$_2$O less than the pressure of the annular chamber 59. The pressure difference between the annular chamber 59 and the reaction zone 70 is measured by a differential pressure measuring instrument 88 that is in communication with the annular chamber 59 through a pressure tap 86 and with the reaction zone 70 through a pressure tap 90. A set-point that corresponds to the desired differential pressure is present in the instrument 88. The instrument 88 provides an output signal 84 that corresponds to the difference between the actual differential pressure and the desired differential pressure across the beds 63 and the line 15;8.

In a preferred method of operation, these two pressure differences—one between the annular chamber 59 and the regeneration zone 10, and the other between the annular chamber 59 and the reaction zone 70—are maintained at or near to their desired values by a control system, as shown in the drawing. The output signals 78 and 84 enter a signal selector 80 which compares the signals and produces an output signal 82. The output signal 82 corresponds to the signal, either 78 or 84, that indicates the greater requirement for nitrogen to reestablish the desired pressure difference. In this way, the output signal 82 adjusts the position of regulating valve 64 according to the differential pressure measuring instrument that indicates the requirement for the greater inflow of nitrogen. This ensures that the nitrogen flow through regulating valve 64 is sufficient to satisfy the desired differential pressures.

The regeneration zone 10 communicates catalyst to the seal zone 60 by line 11, line 12, line 30, valve 32, line 34, line 33, and line 35. These lines are a means for transferring catalyst particles from the regenerator 10 to the seal zone 60 by opening valve 32, and transferring catalyst particles by gravity flow. Valve 32 is an example of a means to interrupt the communication of catalyst particles through lines 30 and 34. When valve 32 is open, it preferably provides uninterrupted communication of catalyst particles through lines 30 and 34, without attriting, chipping, or otherwise damaging the catalyst particles. Valves that are suitable for this service are commercially-available, and those skilled in the art of particle transport are able to select a suitable valve. During catalyst particle replacement, valve 32 is dosed and the catalyst flow from the regeneration zone 10 is not through line 12, but instead through line 14 and out of the process. During catalyst particle replacement, the catalyst flow into the seal zone 60 is not through lines 30 and 34, but instead through line 56 from the addition hopper 50. Preferably, the catalyst particles in line 12 form a fixed packed bed during catalyst particle replacement, but when catalyst particles are being transferred from the regeneration zone 10 into the seal zone 60 the particles in line 12 form a moving From the preceding description, during catalyst particle replacement, nitrogen flows upward through beds 61 and 57, valve 26, and lines 28, 24, 12 and 11, because valve 26 is open. And catalyst particles do not flow from the regeneration zone 10 downward through lines 11, 12, 30, 34, 33, and 35 because valve 32 is dosed. However, catalyst particles also do not flow downward into the seal zone 60 through lines 12, 24 and 26, and valve 26. Those skilled in the art of particle transport are able to design the junction of lines 12, 24 and 30 so that when valve 32 is dosed and valve 26 is open, nitrogen flows upward through lines 28, 24, and 12, but catalyst particles do not flow in the reverse direction and downward through the same lines. As shown in the drawing, this is preferably achieved by installing lines 12 and 30 in a vertical or nearly-vertical orientation, and intersecting line 24 into lines 12 and 30 on a downward slope. The angle that line 24 makes with the horizontal is at least equal to the angle of repose of the catalyst particles, and preferably the angle is 10 or more degrees greater than the angle of repose. The length of the downward sloping section of line 24 is at least 1 foot (0.3 meter) and preferably at least 2 feet (0.6 meter).

From the preceding description, during catalyst particle replacement, the differential pressure measuring instrument 74 measures the differential pressure between the annular chamber 59 and the regeneration zone 10, and this differential pressure is measured as nitrogen flows upward through the beds 61 and 57, valve 26, and lines 28, 24, 12 and 11. At times other than during catalyst particle replacement, valve 26 is closed and valve 32 is open to allow catalyst particles to be transferred from the regeneration zone 10 to the seal zone 60. Therefore, when catalyst particles are being transferred from the regeneration zone 10 to the seal zone 60, instrument 74 measures the differential pressure as nitrogen flows upward through the beds 61 and 57, valve 32, and the lines 35, 33, 34, 30, 12 and 11. Both during catalyst particle replacement and during catalyst transfer between the regeneration zone 10 and the seal zone 60, the differential pressure that instrument 74 measures includes the differential pressure across the beds 61 and 57 and the lines 11 and 12. During catalyst particle replacement, the measured differential pressure includes the pressure difference across valve 26 and lines 24 and 26, all of which contain no catalyst particles. But during catalyst particle transfer from the regeneration zone 10 to the seal zone 60, the measured differential pressure includes the pressure difference across valve 32 and lines 30, 34, 33, and 35, which contain a packed bed of catalyst particles.

All other factors being equal, then, the instrument 74 measures a somewhat-lower differential pressure during catalyst particle replacement than during catalyst transfer because of the lower differential pressure across the catalyst-free valve 26 and lines 24 and 28 in comparison to across the catalyst-containing valve 32 and lines 30, 34, 33, and 35. In order to minimize the difference in measured differential pressures during these two modes of operation, the lengths of the lines 30, 34, and 33 are kept to a minimum. Although the length of line 35 is also kept to a minimum, its length is generally not less than 1 foot (0.3 meter). This prevents the top of the surge bed 57 from getting too near to the gas outlet, and this helps to prevent catalyst particles from being carried upward into the line 28. Preferably, the combined length of lines 11 and 12 is at least 50% of the total length of the lines 11, 12, 30, 34, 33, and 35. More preferably, the combined length of lines 11 and 12 is at least 80% of the total length of lines 11, 12, 33, 34, 33, and 35. Alternatively, during catalyst particle transfer from the regeneration zone 10 to the seal zone 60 when valve 32 is open and valve 26 is closed, the differential pressure across lines 11 and 12 is at least 50% of the total differential pressure across beds 61 and 57, valve 32, and lines 11, 12, 30, 34, 33 and 35. More preferably, the differential pressure across lines 11 and 12 is at least 80% of the total differential pressure across beds 61 and 57, valve 32, and lines 11, 12, 30, 34, 33 and 35.

The packed bed of catalyst particles in the lines 12 and 11 is a preferred means to restrict the gas flow from the seal zone 60 to the regeneration zone 10. The packed bed may be moving or fixed. However, this invention is not limited to a flow restriction comprising a packed bed of catalyst particles, and the means to restrict the gas flow may compose a restriction orifice, baffles, or any other restriction. Preferably, the restriction does not cause attriting, chipping, or any damage to the catalyst particles.

Where lines 11 and 12 are conduits and the means to restrict the gas flow is a packed bed of catalyst particles in the conduits, additional means must be provided to hold the catalyst particles in the conduits both at the lower and upper ends of the conduits. During catalyst transfer the catalyst particles in the surge bed 57 preferably fill the upper chamber of the seal zone 60 up to the bottom of the line 35 in the seal zone 60, and the bed of catalyst particles in the surge bed 57 prevents lines 30, 34, 33 and 35 from draining empty of catalyst, thereby holding the catalyst particles in the line 12. During catalyst replacement, valve 32, which is then closed, and the previously-described angled intersection of line 24 into the junction of lines 30 and 12, together prevent line 12 from draining empty, thereby holding catalyst particles in line 12 at the bottom of line 12. During both catalyst transfer and catalyst particle replacement, the upward flow of gas through the conduits is low enough so as not to fluidize the catalyst particles and carry them out the top of line 12. Moreover, the pecked bed of catalyst in the regeneration zone 10 communicates catalyst particles to line 11. Line 11, in turn, communicates catalyst particles to line 12 and is sufficient to provide enough static head to maintain the particles in at the top of line 12. Other less-preferred means to hold the catalyst particles can also be used, such as baffles or plates, at the top, at the bottom, and within the lines 11 and 12.

During catalyst particle replacement, this invention is not limited to passage of gas from the seal zone 60 into the regeneration zone 10 through the same lines —e.g., lines 11 and 12—through which the catalyst exits the regeneration zone 10 during catalyst transfer. The gas that exits the seal zone 60 may flow through an entirely separate conduit into the regeneration zone 10. Such a conduit would also require a flow restriction for gas flow, and where the flow restriction is a packed bed of particles, the conduit would require means to hold the catalyst particles in the conduit. In this variation of the invention, a separate conduit is in gas communication with both the regeneration zone 10 and with the seal zone 60, contains a packed bed of catalyst particles, and employs the previously-described means for holding the catalyst particles in the conduit. In this variation, the conduit is not used for catalyst transfer, but is instead employed as a flow restriction for the gas that flows from the seal zone 60 to the regeneration zone 10.

In keeping with the preference that the combined length of lines 30, 34, 33 and 35 be kept to a minimum, the length of the flow path of catalyst particles through valve 32 is preferably kept to a minimum, too. Valves that are commercially-available and suitable for this service typically have a length of flow path of between 0.5–1.5 feet (0.15–0.45 meter) and a maximum dimension of the cross-section of the flow path between 2–8 inches (0.05–0.2 meter). Where conduits are used for lines 30, 34, and 33, preferably the length of the conduits 30, 34, and 33 are kept to a minimum, not exceeding 3 feet (0.9 meter).

One other factor—the quantity of catalyst particles in the surge bed 57—also results in the differential pressure instrument 74 measuring a somewhat-lower differential pressure during catalyst particle replacement than during catalyst transfer, but since its effect is generally not significant it is described only in passing. During catalyst transfer, the surge bed 57 preferably fills the upper chamber of the seal zone 60 up to the inlet of line 35 as a packed bed of catalyst particles.

But during catalyst particle replacement, the surge bed 57 may not always fill the upper chamber, in part because the addition of catalyst particles from the hopper 50 may be intermittent. All other factors being equal, then, the instrument 74 measures a somewhat-lower differential pressure during catalyst particle replacement than during catalyst transfer in part because of the lower differential pressure across the smaller surge bed 57. This effect is generally not significant because the cross-section of the surge bed 57 is relatively large in comparison to the cross-section of the purge bed 61 or of the lines 11 and 12. Thus, variations in the catalyst inventory of the surge bed 57 have a relatively small effect on the differential pressure measured by the instrument 74.

The flow rate of the nitrogen through the purge bed 61 is preferably at a rate less than that effective to terminate the flow of catalyst particles through the purge bed 61, thereby allowing the catalyst particles to flow at least intermittently through the purge bed 61. Moreover, the flow rate of the nitrogen through the purge bed 61 is preferably at a rate less than that effective to fluidize the catalyst in the purge bed 61. In addition, the flow rate of the purge stream is not less than that effective to purge oxygen from the total void volume in the purge bed 61. The total void volume in the purge bed 61 is defined as the volume of the pores within the catalyst particles plus the voltage volume between the catalyst particles in the purge bed 61. The physical characteristics of the catalyst determine the volume of the pores within the catalyst particles, and the voltage volume between the catalyst particles depends on how densely the catalyst particles are packed in the purge bed 61. Since the rate at which the total void volume enters the purge bed 61 depends on the rate of flow of the catalyst particles, the flow rate of the purge stream that is effective to purge oxygen from the total void volume depends on the rate of flow of the entering catalyst particles. Preferably, the ratio of the volume of purge stream to the total void volume entering the purge bed 61 is greater than 1.0, provided that the purge stream does not interfere with the flow of catalyst particles as previously described in this paragraph. Depending on the physical characteristics of the catalyst, the ratio of the volume of purge stream to the total void volume entering the purge bed 61 may be between 2.5 and 3.5. Preferably, the residence time of the catalyst particles in the purge zone 61 is between 0.1 and 60 minutes, and more preferably between 0.5 and 30 minutes. The gas stream that exits the purge bed 61 comprises nitrogen and oxygen and is passed from the seal zone 60 into the regeneration zone 10. The nitrogen is ultimately rejected from the regeneration zone 10 in any suitable stream, typically the regeneration zone vent stream.

What is claimed is:

1. A method for the replacement of particles in a process, said method comprising:

(a) withdrawing a first stream comprising particles from a first zone and rejecting said first stream from said process;

(b) introducing a second stream comprising particles and a first fluid to a second zone, and passing particles through said second zone;

(c) passing a third stream comprising a second fluid to said second zone at a rate that is sufficient to purge said first fluid from the total void volume in said second zone;

(d) withdrawing a fourth stream comprising said first fluid and said second fluid from said second zone and passing said fourth stream to said first zone; and (e) withdrawing a fifth stream comprising particles and said second fluid from said second zone and passing said fifth stream to a third zone that is in uninterrupted communication with said second zone, said fifth stream comprising sufficient second fluid to inhibit passing fluid from said third zone to said second zone.

2. The method of claim 1 further characterized in that said first zone operates at a first pressure and said second zone operates at a second pressure and the rate of passing said third stream to said second zone is regulated in response to the difference in pressure between said first pressure and said second pressure.

3. The method of claim 2 further characterized in that said second pressure is not less than said first pressure.

4. The method of claim 1 further characterized in that said second zone operates at a second pressure and said third zone operates at a third pressure and the rate of passing said third stream to said second zone is regulated in response to the difference in pressure between said second pressure and said third pressure.

5. The method of claim 4 further characterized in that said third pressure is less than said second pressure.

6. The method of claim 1 further characterized in that said fourth stream passes from said second zone to said first zone through a conduit containing a packed bed of particles.

7. The method of claim 1 further characterized in that said second fluid passes countercurrent to said passing of particles through said second zone.

8. The method of claim 1 further characterized in that the rate of passing of said second fluid through said second zone is less than that effective to terminate the passing of particles through said second zone.

9. The method of claim 1 further characterized in that the rate of introduction of particles into said second zone is not less than the rate of withdrawal of particles from said first zone.

10. The method of claim 1 further characterized in that the rate of introduction of particles into said second zone is not less than the rate of withdrawal of said particles from said second zone.

11. The method of claim 1 further characterized in that said second zone operates at conditions including a residence time of particles therein of between 0.1 and 60 minutes.

12. The method of claim 1 further characterized in that the ratio of the volume of said third stream to the total void volume entering said second zone is greater than 1.0.

13. The method of claim 1 further characterized in that at least a portion of said particles in said second zone forms at least intermittently a packed bed of particles.

14. The method of claim 1 further characterized in that the velocity of said second fluid in said second zone is less than the velocity effective to fluidize said particles.

15. The method of claim 1 further characterized in that said second fluid comprises molecular nitrogen.

16. The method of claim 1 further characterized in that particles in said second stream are introduced into a fourth zone prior to being passed into said second zone.

17. The method of claim 1 further characterized in that the differential pressure between said first zone and said second zone and the differential pressure between said second zone and said third zone are controlled, by:

(a) establishing a first signal representative of the desired differential pressure between said first zone and said second zone;

(b) establishing a second signal representative of the actual differential pressure between said first zone and said second zone;

(c) comparing said first signal and said second signal and establishing a third signal, wherein said third signal is responsive to the difference between said first signal and said second signal;

(d) establishing a fourth signal representative of the desired differential pressure between said second zone and said third zone;

(e) establishing a fifth signal representative of the actual differential pressure between said second zone and said third zone;

(f) comparing said fourth signal and said fifth signal and establishing a sixth signal, wherein said sixth signal is responsive to the difference between said fourth signal and said fifth signal; and (g) comparing said third signal and said sixth signal and establishing a seventh signal which is responsive to said third signal or said sixth signal, wherein said seventh signal positions a first valve operably located so as to control the flow of said third stream.

18. A method for the replacement of catalyst particles in a process, said method comprising:

(a) passing catalyst particles from a first zone to a second zone;

(b) passing catalyst particles from said second zone to a third zone;

(c) interrupting said passage of catalyst particles from said first zone to said second zone;

(d) withdrawing a first stream comprising catalyst particles from said first zone and rejecting said first stream from said process;

(e) introducing a second stream comprising catalyst particles and oxygen to a second zone, and passing catalyst particles through said second zone;

(f) passing a third stream comprising nitrogen to said second zone at a rate that is sufficient to purge oxygen from the total void volume in said second zone;

(g) withdrawing a fourth stream comprising oxygen and nitrogen from said second zone and passing said fourth stream to said first zone; and (h) withdrawing a fifth stream comprising catalyst particles and nitrogen from said second zone and passing said fifth stream to a third zone that is in uninterrupted communication with said second zone, said fifth stream comprising sufficient second fluid to inhibit passing fluid from said third zone to said second zone.

* * * * *